3,761,459
POLYPEPTIDE

Janos Pless, Basel, Stephan Guttmann, Allschwil, and Roger Boissonnas, Bottmingen, Switzerland, assignors to Sandoz Ltd. (also known as Sandoz A.G.), Basel, Switzerland
No Drawing. Filed July 20, 1966, Ser. No. 566,476
Claims priority, application Switzerland, Aug. 24, 1965, 11,898/65
Int. Cl. C07c *103/52;* C07g *7/00*
U.S. Cl. 260—112.5     1 Claim

ABSTRACT OF THE DISCLOSURE

The invention describes a new pentacosapeptide of the formula D-seryl-L-tyrosyl-L-seryl-L-norleucyl-L-glutamyl-L-histidyl - L - phenylalanyl-L-arginyl-L-tryptophanyl-glycyl-L-lysyl-L-prolyl-L-valyl-glycyl - L - lysyl-L-lysyl-L-arginyl-L-arginyl - L - prolyl - L - valyl-L-lysyl-L-valyl-L-tyrosyl-L-prolyl-L-valinamide, its therapeutically active acid addition salts and heavy metal complexes. The polypeptide of the invention, also named D-Ser$^1$-Nle$^4$-Val—NH$_2$$^{25}$-$\alpha^{1-25}$—ACTH, is pharmaceutically useful because of its high adrenocorticotropic effect.

---

The present invention relates to a new polypeptide and to a process for the production thereof.

The present invention provides the pentacosapeptide of formula D - seryl-L-tyrosyl-L-seryl-L-norleucyl-L-glutamyl-L-histidyl-L-phenylalanyl - L - arginyl-L-tryptophanyl-glycyl-L-lysyl-L-prolyl-L-valyl-glycyl - L - lysyl-L-lysyl-L-arginyl - L - arginyl - L - prolyl-L-valyl-L-lysyl-L-valyl-L-tyrosyl-L-prolyl-L-valinamide, hereinafter named D-Ser$^1$-Nle$^4$-pentacosapeptide, its therapeutically active acid addition salts and heavy metal complexes. D-Ser$^1$-Nle$^4$-pentacosapeptide, its salts and heavy metal complexes exhibit a high adrenocorticotropic effect.

The synthesis of a pentacosapeptide of formula L-seryl-L-tyrosyl-L-seryl - L - norleucyl-L-glutamyl-L-histidyl-L-phenylalanyl - L - arginyl-L-tryptophanyl-glycyl-L-lysyl-L-proyl-L-valyl-glycyl-L-lysyl - L - lysyl - L - arginyl - L-arginyl-L-proyl - L - valyl - L - lysyl-L-valyl-L-tyrosyl-L-prolyl-L-valinamide, having a corticotropic effect and hereinafter named Nle$^4$-pentacosapeptide, is known.

An advantage of Nle$^4$-pentacosapeptide over natural ACTH is that the former has no antigenic effects. A further advantage is that Nle$^4$-pentacosapeptide, in contradistinction to natural ACTH, is devoid of a methionine radical in the 4-position, which methionine radical is easily oxidized whereby the hormone becomes inactive; Nle$^4$-pentacosapeptide contains a norleucine radical in place of the methionine radical present in ACTH, which norleucine radical has the same steric properties as the methionine radical, but is stable to oxidation. Furthermore, Nle$^4$-pentacosapeptide has a valinamide radical in the 25-position, which is not present in this position in natural ACTH. This valinamide radical on the carboxyl terminal protects the peptide chain from enzymatic degradation. However, Nle$^4$-pentacosapeptide contains an L-serine radical in the 1-position, as does natural ACTH; this L-serine radical is easily affected by aminopeptidase degradation.

Attempts were therefore made to replace this terminal L-serine radical of Nle$^4$-pentacosapeptide by a radical which is stable to aminopeptidase degradation.

Replacement of the terminal L-serine radical of Nle$^4$-pentacosapeptide by a D-serine radical yielded D-Ser$^1$-Nle$^4$-pentacosapeptide which is not affected by aminopeptidases. As D-amino acid radicals are not found in the natural, biologically active peptide hormones, it was not to be expected that the replacement of a natural amino acid radical by an antipode not occurring in nature would result in a compound having biological and therapeutical properties not only qualitatively equal but also quantitatively superior to those of natural ACTH, as will be explained in detail hereinafter.

D-Ser$^1$-Nle$^4$-pentacosapeptide may be produced by methods for the synthesis of compounds of this type in actual use or described in the literature on the subject, it being possible to join together the amino acids in the order indicated in the above formula one at a time or by first forming constituent peptide units and joining these together.

One method of producing D-Ser$^1$-Nle$^4$-pentacosapeptide consists in that L-valyl-$\epsilon$-N-R-L-lysyl-L-valyl-L-tyrosyl-L-prolyl-L-valinamide, in which R signifies a carbo-tert-butoxy or a carbo-tert-amyloxy, a toluene sulphonyl, a phthalyl, a formyl or a trifluoroacetyl radical, is condensed with N-carbobenzoxy-L-valyl-glycyl-$\epsilon$-N-R-L-lysyl-$\epsilon$-N-R-L-lysyl-nitro-L-arginyl-nitro - L - arginyl-L-proline, in which R has the above significance, the resulting N-carbobenzoxy - L - valyl-glycyl-$\epsilon$-N-R-L-lysyl-$\epsilon$-N-R-L-lysyl-nitro-L-arginyl-nitro - L - arginyl-L-prolyl-L-valyl-$\epsilon$-N-R-L-lysyl-L-valyl-L-tyrosyl-L-prolyl-L - valinamide, in which R has the above significance, is condensed with N-triphenylmethyl-$\gamma$ - O - tert-butyl - L - glutamyl-Im-triphenylmethyl - L - histidyl - L - phenylalanyl-L-arginyl-L-tryptophanyl-glycyl-$\epsilon$-N-R-L-lysyl-L-proline, in which R has the above significance, after removal of the carbobenzoxy radical and the nitro radicals, the resulting N-triphenylmethyl-$\gamma$ - O - tert-butyl - L - glutamyl-Im-triphenylmethyl - L - histidyl-L-phenylalanyl - L - arginyl-L-tryptophanyl-glycyl-$\epsilon$-N-R - L - lysyl - L - prolyl-L-valyl-glycyl-$\epsilon$-N-R-L-lysyl-$\epsilon$-N-R-L-lysyl - L - arginyl-L-arginyl-L-prolyl - L - valyl-$\epsilon$-N-R-L-lysyl-L-valyl - L - tyrosyl-L-prolyl-L-valinamide, in which R has the above significance, is condensed with N-R'-D-seryl-L-tyrosyl-L-seryl-L-norleucyl azide, in which R' signifies a triphenylmethyl, a carbo-tert-butoxy or a carbo-tert-amyloxy, a carbobenzoxy, a trifluoroacetyl, an acetyl, a chloroacetyl or a formyl radical, after splitting off the N-triphenylmethyl radical, and all the protective radicals of the resulting new, protected pentacosapeptide N-R'-D-seryl-L-tyrosyl-L-seryl-L-norleucyl - $\gamma$ - O-tert-butyl-L-glutamyl-Im-triphenylmethyl-L-histidyl-L-phenylalanyl - L - arginyl - L-tryptophanylglycyl-$\epsilon$-N-R-L-lysyl-L-prolyl-L-valyl - glycyl-$\epsilon$ - N-R-L-lysyl - $\epsilon$ - N-R-L-lysyl-L-arginyl-L-arginyl-L-prolyl-L-valyl - $\epsilon$-N-R-L-lysyl-L-valyl-L-trosyl-L-prolyl-valinamide, in which R and R' have the above significance, are removed in one or more stages in an acid medium.

The starting materials for producing D-Ser$^1$-Nle$^4$-pentacosapeptide, insofar as they were hitherto unknown, may be obtained by methods for the synthesis of peptides in actual use or described in the literature, it being possible to join together the amino acids one at a time or by first forming constituents peptide units and joining these together.

It should be noted that D-Ser$^1$-Nle$^4$-peptacosapeptide may likewise be obtained or used in the form of its salts.

Examples of acids for acid addition salt formation are: acetic, propionic, glycolic, lactic, pyruvic, malonic, succinic, maleic, fumaric, tartaric, citric, benzoic, cinnamic, salicylic, 2-phenoxy- or 2-acetoxy-benzoic, mandelic, methanesulphonic, ethanesulphonic, hydroxyethanesulphonic, benzene- or toluenesulphonic, naphthalenesulphonic and sulphanilic acid, polymeric acids, e.g. tannic, alginic or polygalacturonic acid, polyphloretinic phosphate or carboxymethyl cellulose, and halogen hydracids, e.g. hydrochloric or hydrobromic acid, nitric, thiocyanic, sulphuric and phosphoric acid. Zinc may, for example, be used for the heavy metal complex.

A major advantage of the synthetic pentacosapeptide over the natural hormone extracted from animal material is that the former has no antigenic effects.

According to the usual and accepted standard tests the biological activity of D-Ser$^1$-Nle$^4$-pentacosapeptide amounts to 625±130 corticotropin IU for every mg. of free peptide. The pentacosapeptide of the invention was tested in accordance with the third International Standard for corticotropin, which is available in the form of an "International Standard for Corticotropin" and permits the standardization of ACTH preparations in International Units. It has been found that upon intravenous administration the new pentacosaperptide has a longer duration of action than the hitherto known naturally occurring and synthetic ACTH compounds. The dose of the pentacosapeptide of the invention ranges from about 40 to 60 IU daily, in exceptional cases between 10 and 100 IU daily. The unexpectedly high activity of the new pentacosapeptide, which was ascertained upon standardization, has been confirmed upon therapeutic application so that on a weight basis the new pentacosapeptide is more active than all hitherto known naturally occurring and synthetic ACTH compounds.

D-Ser$^1$-Nle$^4$-pentacosapeptide may be used as medicament, for example in the form of a pharmaceutical preparation. This may contain the said compound in mixture with an organic or inorganic carrier material which is suitable for parenteral administration. Appropriate carrier materials are substances which do not react with the new compound, e.g. gelatin, lactose, starch, magnesium stearate, talcum, vegetable oils, benzyl alcohols, gum arabic, polyalkylene glycols, Valseline, cholesterol and other known pharmaceutical carrier materials. The pharmaceutical preparations may, for example, be used in the liquid form as solutions, suspensions or emulsions. They may be sterilized and/or they may contain adjuvants, such as preserving, stabilizing, wetting or emulsifying agents. However, they may contain other therapeutically valuable substances. The new compound may also be administered in the form of a depot preparation as is the case with natural ACTH.

Examples of radicals for blocking the amino radical of the serine radical during the synthetic of the new pentacosapeptide are the triphenylmethyl, the carbo-tert-butoxy and the carbo-tert-amyloxy radical, but other suitable protective radicals, e.g. the carbobenzoxy, the trifluoroacetyl, the acetyl, the chloroacetyl and the formyl radical, may likewise be used. Suitable radicals for blocking the ε-amino radical of the lysine radical are the carbo-tert-butoxy and the carbo-tert-amyloxy radical, but other suitable protective radicals, e.g. the carbobenzoxy, toluenesulphonyl, phthalyl, formyl and trifluoroacetyl radical, may likewise be used. A suitable radical for blocking the γ-carboxyl radical of the glutaminic acid radical is the tert-butyloxy radical, but other suitable protective radicals, e.g. the methoxy, the ethoxy, the tert-amyloxy, the amide or the benzyloxy radical may likewise be used.

A suitable radical for the blocking of the imidazole radical of the histidine radical is the triphenylmethyl radical, but other suitable protective radicals, e.g. the carbo-tert-butoxy, carbo-tert-amyloxy, carbobenzoxy or benzyl radical may likewise be used.

A suitable radical for the blocking of the guanido radical of the arginine radical is the nitro radical, but other suitable protective radicals, e.g. the tosyl, p-nitrocarbobenzoxy or the 2-(isopropyloxycarbonyl)-3,4,5,6-tetrachlorobenzoyl radical may likewise be used. It is also possible to use the protective effect of the protonization of the guanido radical during the synthesis.

The following abbreviations are used in the text and in the drawings:

CBO=carbobenzoxy
Trit=trityl=Triphenylmethyl
CTB=carbo-tert-butyloxy
NO$_2$=nitro
OCP=2,4,5-trichlorophenoxy
OTB=tert-butyloxy
OMe=methoxy
OEt=ethoxy
Arg=L-arginyl
Glu=L-glutamyl
Gly=glycyl
His=L-histidyl
Lys=L-lysyl
Nle=L-norleucyl
Phe=L-phenylalanyl
Pro=L-prolyl
Ser—L-seryl
D-Ser=D-seryl
Try=L-tryptophanyl
Tyr=L-tyrosyl
Val=L-valyl
Im=imidazolyl In the following non-limitative examples all temperatures are indicated in degrees centigrade.

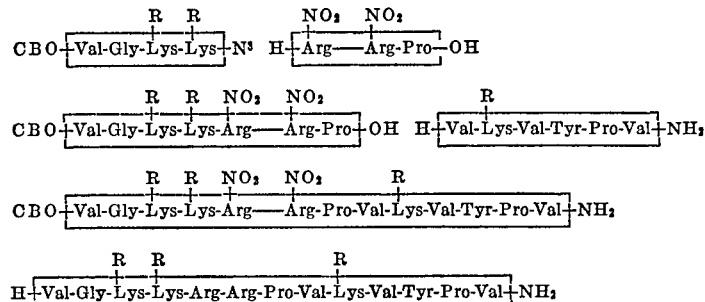

FIG. A.—Production of H-Val-Gly-(R)Lys-(R)Lys-Arg-Arg-Pro-Val-(R)Lys-Val-Tyr-Pro-Val-NH$_2$ Fig. B.—Production of H-D-Ser-Tyr-Ser-Nle-Glu-His-Phe-Arg-Try-Gly-Lys-Pro-Val-Gly-Lys-Lys-Arg-Arg-Pro-Val-Lys-Val-Tyr-Pro-Val-NH₂

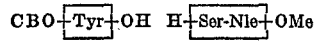

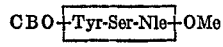

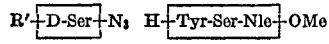

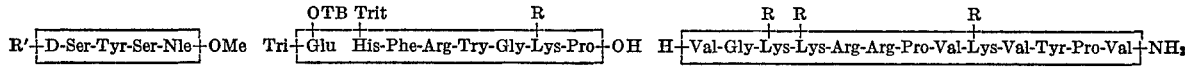

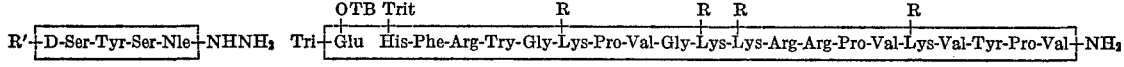

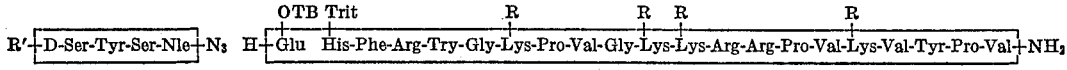

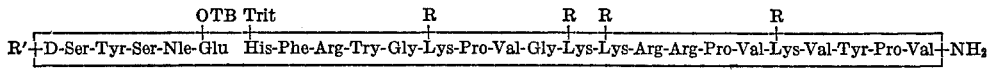

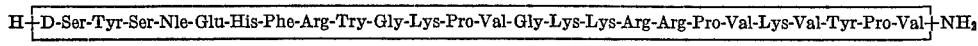

EXAMPLE 1

1-valyl-glycyl-carbo-tert-butoxy-L-lysyl-carbo-tert-butoxy-L-lysyl-L-arginyl-L-arginyl-L-prolyl-L-valyl-carbo-tert-butoxy-L-lysyl-L-valyl-L-tyrosyl-L-prolyl-L-valinamide. (H-Val-Gly-(CTB)Lys-(CTB)Lys-Arg-Arg-Pro-Val-(CTB)Lys-Val-Tyr-Pro-Val-NH₂)

88 g. of CBO-(NO₂)Arg-(NO₂)Arg-Pro-OMe are dissolved in a mixture of 90% dioxane and water and 220 cc. of a 2 N sodium hydroxide solution are added. After two hours the solution is diluted with 1 litre of water and washed out several times with ethyl acetate. The aqueous solution is subsequently acidified with 4 N hydrochloric acid, the precipitated product is dissolved in a mixture of methanol/acetone (1:1) and precipitation is effected by the addition of ethyl ether. 70 g. of CBO-(NO₂)Arg-(NO₂)Arg-Pro-OH, having a melting point of 108° (with decomposition), $[\alpha]_D = -19°$ in dimethyl formamide, are obtained. The tripeptide obtained above is dissolved in 400 ml. of a 33% solution of hydrogen bromide in glacial acetic acid, the solution is allowed to stand at 20° for one hour, is concentrated to 200 ml. and precipitated with ethyl ether; filtration, washing with ethyl acetate and drying are effected. 72 g. of H-(NO₂)Arg-(NO₂)Arg-Pro-OH·3HBr, having a melting point of 84° (with decomposition), $[\alpha]_D^{21} = -19°$ in 95% acetic acid, are obtained. 84 g. of CBO-Val-Gly-(CTB)Lys-(CTB)Lys-N₃ (produced from 85 g. of the corresponding hydrazide) are added at 0° to a solution of 72 g. of H-(NO₂)Arg-(NO₂)Arg-Pro-OH hydrobromide in 600 ml. of dimethyl formamide and 56 ml. of triethylamine. The solution is allowed to stand for 16 hours and the solvent is evaporated. The residue is dissolved in a mixture of n-butanol/ethyl acetate (2:8) and washed several times with dilute sulphuric acid. The volume of the solution is reduced in a vacuum and precipitation is effected with ether. 90 g. of CBO - Val - Gly-(CTB)Lys-(CTB)Lys-(NO₂)Arg-(NO₂)Arg-Pro-OH, having a melting point of 151° (with decomposition), $[\alpha]_D = -38°$ in methanol, are obtained.

56 g. of CBO-Val-Gly-(CTB)Lys-(CTB)Lys-(NO₂)Arg-(NO₂)Arg-Pro-OH are dissolved in 900 ml. of dimethyl formamide and 900 ml. of tetrahydrofuran. After the addition of 6.2 ml. of triethylamine the solution is cooled to −10° and 4.2 ml. of chloroformic acid ethyl ester are added at this temperature. After 10 minutes 36 g. of H-Val-(CTB)Lys-Val-Tyr-Pro-Val-NH₂ in 160 ml. of dimethyl formamide are added and stirring is effected at 20° for a further 16 hours. The solvent is evaporated in a vacuum and the residue washed with water. The peptide is dissolved in hot ethanol and precipitated with ethyl acetate. After filtering with suction and drying, 72 g. of CBO - Val - Gly - (CTB)Lys-(CTB)Lys-(NO₂)Arg-(NO₂)Arg - Pro - Val-(CTB)Lys-Val-Tyr-Pro-Val-NH₂, having a melting point of 190° (with decomposition), $[\alpha]_D = -36°$ in dimethyl formamide, are obtained.

72 g. of CBO-Val-Gly-(CTB)Lyns-(CTB)Lys-(NO₂)Arg-(NO₂)Arg-Pro-Val-(CTB) Lys-Val-Tyr-Pro-Val-NH₂ are dissolved in 1.5 litres of 80% acetic acid, a palladium catalyst is added, hydrogenation is effected until hydrogen is no longer taken up and the catalyst is filtered off. After reducing the volume of the solution, the residue is dissolved in 500 ml. of methanol, cooled to −5°, 4.1 g. of p-toluenesulphonic acid are added and precipitation is subsequently effected with ether. 66 g. of H-Val-Gly-(CTB)Lys - (CTB)Lys-Arg-Arg-Pro-Val-(CTB)Lys-Val-Tyr-Pro-Val-NH₂ are obtained as trityl-toluene sulphonate, having a melting point of 185° (with decomposition), $[\alpha]_D^{20} = -42°$ in dimethyl formamide.

EXAMPLE 2

O - tert - butyl-L-glutamyl-Im-trityl-L-histidyl-L-phenylalanyl - L - arginyl-L-tryptophanyl-glycyl-N-carbo-tert-butoxy - L - lysyl-L-prolyl-L-valyl-glycyl-N-carbo-tert-butoxy - L-lysyl-N-carbo-tert-butoxy-L-lysyl-L-arginyl-L- arginyl-L-prolyl-L-valyl-N-carbo-tert-butoxy-L-lysyl-L - valyl - L-tyrosyl-L-prolyl-L-valinamide. (H-(OTB) Glu - (Trit)-His-Phe-Arg-Try-Gly-(CTB)Lys-Pro-Val-Gly - (CTB)Lys - (CTB)Lys-Arg-Arg-Pro-Val-(CTB) Lys-Val-Tyr-Pro-Val-NH₂)

62 g. of H-Val-Gly-(CTB)Lys-(CTB)Lys-Arg-Arg-Pro - Val-(CTB)Lys-Val-Tyr-Pro-Val-NH₂·3Tos-OH are dissolved in 300 ml. of pyridine and 300 ml. of acetonitrile. 57 g. of Trit-(OTB)Glu-(Trit)His-Phe-Arg-Try-Gly-(CTB)Lys-Pro-OH are subsequently added and when all the material is dissolved, cooling is effected to 0° and 28.6 g. of dicyclohexyl carbodiimide are added. After shaking at 20° for 24 hours, the urea is filtered off and the solution precipitated with ether. The product is dissolved several times in methanol and precipitated with ethyl acetate. 90 g. of Trit-(OTB)Glu-(Trit)His-Phe-Arg-Try - Gly-(CTB)Lys-Pro-Val-Gly-(CTB)Lys-(CTB)Lys-Arg-Arg-Pro-Val-(CTB)Lys-Val-Tyr-Pro-Val-NH₂ trityl-toluene sulphonate, having a melting point of 184° (with decomposition), $[\alpha]_D^{20} = -51°$ in methanol, are obtained.

45 g. of Trit-(OTB)Glu-(Tri)His-Phe-Arg-Try-Gly-(CTB)Lys-Pro-Val-Gly-(CTB)Lys-(CTB)Lys-Arg-Arg-Pro-Val-(CTB)Lys-Val-Tyr-Pro-Val-NH₂. 3 Tos-OH are dissolved in 50 ml. of 80% acetic acid and the solution is allowed to stand at 30° for 2 hours. 50 ml. of Amberlite IRA–410 in the acetate form are added, filtration and evaporation in a vacuum are effected and the residue is dissolved in methanol. After precipitating with ether, 40 g. of H-(OTB)Glu-(Trit)His-Phe-Arg-Try-Gly-(CTB)Lys-Pro-Val-Gly-(CTB)Lys-(CTB)Lys - Arg-Arg-Pro-Val-(CTB)Lys-Val-Tyr-Pro-Val-NH$_2$, having a decomposition point of 170°, $[\alpha]_D^{20}=-49°$ in methanol, are obtained.

EXAMPLE 3

L-tyrosyl-L-seryl-L-norleucine methyl ester (H-Tyr-Ser-Nle-OMe)

54 g. of H-Ser-Nle-OMe.HCl and 63 g. of CBO-Tyr-OH are dissolved in 860 ml. of acetonitrile, cooling is effected to 0°, 28 ml. of triethylamine are added, cooling is effected to −10° and 41 g. of dicyclohexyl carbodiimide are added. The mixture is stirred at 0° for 16 hours and is then filtered. The precipitate is washed with 1400 ml. of pyridine. The combined filtrates are evaporated and the rsidue crystallized from ethyl acetate. 101 g. of CBO-Tyr-Ser-Nle-OMe, having a melting point of 140–142°, $[\alpha]_D^{20}=-15°$ in dimethyl formamide, are obtained.

51 g. of the resulting product are dissolved in 2 litres of a N solution of HCl in methanol and hydrogenation is effected in the presence of 10 g. of palladium/charcoal. After about 2 hours hydrogen is no longer taken up. Filtration and evaporation are effected and the residue is crystallized from a mixture of mehtanol/ether (3:1). 42 g. of H-Tyr-Ser-Nle-Ome.HCl, having a melting point of 227°, $[\alpha]_D^{20}=-7°$ in dimethyl formamide, are obtained.

EXAMPLE 4

Carbo-tert-butoxy-D-seryl-L-tyrosyl-L-seryl-L-norleucine hydrazide. (CTB-D-Ser-Tyr-Ser-Nle-NHNH$_2$)

60 g. of D-serine methyl ester hydrochloride are dissolved in 200 ml. of dimethyl formamide and 54 ml. of triethylamine, cooling is effected to 0° and the triethylamine hydrochloride is filtered off. Dimethyl formamide is evaporated in a high vacuum and the residue dissolved in 150 ml. of pyridine. 100 g. of tert-butyl-oxy-carbonyl azide are added dropwise and the mixture is allowed to stand at 20° for 2 days. The solvent is evaporated and the product is taken up in ethyl acetate. After washing with water, dilute hydrochloric acid and potasisum bicarbonate solution, drying is effected over sodium sulphate. After evaporating the ethyl acetate, CTB-D-Ser-OMe results as an oil. The ester is dissolved in 500 ml. of methanol and is allowed to stand at 20° with 50 ml. of hydrazine hydrate for 2 days. After evaporating the methanol, the hydrazide crystallizes. After recrystallization from hot ethyl acetate, 53 g. of CTB-D-Ser-NHNH$_2$, having a melting point of 114°, $[\alpha]_D^{21}=-3°$ in dimethyl formamide, are obtained.

10 g. of CTB-D-serine hydrazide are dissolved at −10° in 136 ml. of N hydrochloric acid containing 15 g. of sodium chloride. 160 ml. of ethyl acetate and subsequently 3.8 g. of sodium nitrite are added in 3 portions at the same temperature. The mixture is allowed to react for a further 5 minutes at −10° whilst stirring continuously. The ethyl acetate phase is separated, washed with a cold 10% potassium bicarbonate solution and dried with sodium sulphate. A solution of 13 g. of H-Tyr-Ser-Nle-OMe hydrochloride in 60 ml. of dimethyl formamide and 6 ml. of triethylamine is added to the dried solution. The ethyl acetate is subsequently evaporated in a vacuum and the solution allowed to stand at 20° for 16 hours. The remaining solvent is evaporated in a vacuum and the residue dissolved in ethyl acetate. Washing with dilute phosphoric acid and potassium bicarbonate solution and drying over sodium sulphate are effected. After evaporation the solvent and precipitate with ether, 15 g. of CTB-D-Ser-Tyr-Ser-Nle-OMe, having a melting point of 135°, $[\alpha]_D^{20}=-6°$ in methanol, are obtained.

11 g. of CTB-D-Ser-Tyr-Ser-Nle-OMe are dissolved in 100 ml. of methanol and 4.5 ml. of hydrazine hydrate are added. The mixture is allowed to stand over night at 20°, whereupon the product crystallizes. Filtration and washing with methanol and petroleum ether are effected. 7.7 g. of CTB-D-Ser-Tyr-Ser-Nle hydrazide, having a melting point of 210°, $[\alpha]_D^{20}=+6.4°$ in dimethyl formamide, are obtained.

EXAMPLE 5

D-seryl - L - tyrosyl-L-seryl-L-norleucyl-L-glutamyl - L-histidyl - L - phenylalanyl-L-arginyl - L - tryptophanyl-glycyl - L - lysyl-L-prolyl-L-valyl-glycyl-L-lysyl-L-lysyl-L-arginyl-L-arginyl - L - prolyl-L-valyl-L-lysyl-L-valyl-L-tyrosyl-L-prolyl-L-valinamide. (D - Ser-Tyr-Ser-Nle-Glu-His-Phe-Arg-Try-Gly - Lys-Pro-Val-Glys-Lys-Lys-Arg-Arg-Pro-Val-Lys-Tyr-Pro-Val-NH$_2$)

2.0 g. of CTB-D-Ser-Tyr-Ser-Nle-NHNH$_2$ (Example 4) are dissolved in 12 ml. of dimethyl formamide, 4 ml. of water are added, cooling is effected to −10°, 2 ml. of 6 N hydrochloric acid and subsequently 280 mg. of sodium nitrite are added, stirring is effected at −5° for 5 minutes, 300 ml. of 0.2 N potassium bicarbonate solution are added and the mixture is centrifuged. The resulting CTB-D-Ser-Tyr-Ser-Nle-N$_3$ is dissolved in 50 ml. of dimethyl formamide, 10.5 g. of H-Glu(OTB)-(Trit)His-Phe - Arg-Try-Gly-(CTB)Lys-Pro-Val-Gly-(CTB) - Lys (CTB)Lys-Arg-Arg-Pro - Val - (CTB)Lys-Val-Tyr-Pro-Val-NH$_2$ acetate are added, the mixture is allowed to stand at 0° for 12 hours, a further amount of tetrapeptide azide produced from 2.0 g. CTB - D-Ser-Tyr-Ser-Nle-NHNH$_2$ is added, the mixture is allowed to stand at 0° for 6 hours, is evaporated, treated with ethyl acetate, washed with hot acetone and ethyl acetate and dried in a vacuum. The resulting product is dissolved in 100 ml. of 90% trifluoroacetic acid, the solution is allowed to stand at 20° in an atmosphere of nitrogen for one hour, is evaporated, treated with ethyl acetate, filtered and dried. The resulting product is dissolved in 500 ml. of 0.2 N acetic acid, the solution is treated with Amberlite IRA–410 in the acetate form, is filtered and liophilized. After drying over sodium hydroxide, 7.5 g. of H-D-Ser-Tyr-Ser-Nle-Glu-His-Phe-Arg-Try-Gly-Lys-Pro - Val-Gly-Lys-Lys-Arg-Arg-Pro-Val-Lys-Val-Tyr-Pro-Val-NH$_2$ heptaacetate decahydrate, having a homogeneous behaviour in chromatography and electrophoresis, are obtained. (Total hydrolysis gives the following composition of amino acids:

Ser$_{1.9}$Tyr$_{1.9}$Nle$_{1.1}$Glu$_{1.0}$His$_{1.0}$Phe$_{1.1}$
    Arg$_{3.1}$Gly$_{2.0}$Lys$_{4.1}$Pro$_{3.0}$Val$_{3.9}$)

*Microanalysis.*—Calculated (percent): C, 51.9; H, 7.5; N, 16.2; O, 24.4. Found (percent): C, 52.1; H, 7.5; N, 15.6; O, 24.8. Melting point 209° with decomposition, $[\alpha]_D^{20}=-80°$ in N acetic acid.

Galenical Example: Ampoule

25 I.U. of peptide (mg.).

|  | G. |
|---|---|
| Concentrated acetic acid about | 0.0011 |
| Sodium acetate.3H$_2$O | 0.002 |
| Sodium chloride | 0.007 |
| Benzyl alcohol | 0.009 |
| Water ad 1.005 g. | |

What is claimed is:
1. D-seryl-L-trosyl-L-seryl-L-norleucyl - L - glutamyl-L - histidyl - L - phenylalanyl-L-arginyl-L-tryphophanyl-glycyl - L - lysyl-L-prolyl-L-valyl-glycyl-L-lysyl-L-lysyl-L-arginyl - L - arginyl-L-prolyl-L-valyl-L-lysyl-L-valyl-L-tyrosyl - L - prolyl-L-valinamide and the pharmaceutically acceptable acid addition salts and heavy metal complexes thereof.

References Cited

UNITED STATES PATENTS 3,228,926  1/1966  Kappeler et al. ____ 260—112.5

OTHER REFERENCES

Boissonnas et al.: Experientia 22, 526 (1966).
Doepfner: Experientia 22, 527–528 (1966).
Guttmann et al.: Acta Acad. Sci. Hung 44, 141–142 (1965).
Jenny et al.: Experientia 22, 528–530 (1966).
Netherlands Application, 6,510,560, February 1966, Ciba (assignee).

ELBERT L. ROBERTS, Primary Examiner

U.S. Cl. X.R.

424—179